3,580,881
POLYURETHANE COATING SYSTEM
Henry J. Lee, 12 Knollwood Drive,
Cherry Hill, N.J. 08034
No Drawing. Filed Feb. 27, 1970, Ser. No. 15,227
Int. Cl. C08g 22/06, 51/34, 51/36
U.S. Cl. 260—30.4                                10 Claims

ABSTRACT OF THE DISCLOSURE

Present invention relates to a novel and improved method of protecting a surface with a polyurethane coating that exhibits outstanding chemical and physical properties. The improved process utilizes the ability of aromatic polyisocyanates to dimerize and trimerize and react with a short chain aliphatic glycol under carefully controlled conditions of heat to form a unique prepolymer. The prepolymer, when dissolved in a suitable solvent, has a prolonged stable shelf life and, when applied to the surface to be protected, cures itself on the mere evaporation of the solvent.

---

The invention described herein may be manufactured and used by or for the Government of the United States of America for governmental purposes without the payment of any royalties thereon or therefor.

Polyurethanes used for coating applications have been generally prepared in the past either from two component systems with short pot lives or from one shot blocked-isocyanate systems where the material used to block the isocyanate must be highly volatile or easily decomposed. Moreover, previously formulated polyurethanes lack hydrolytic stability or thermal stability above 350° F. Shore Durometer D scale hardness test readings of 80 or greater are furthermore rarely obtained on previously formulated polyurethane coatings.

It is therefore a principal object of the invention to provide a novel and improved method of protecting a surface with a polyurethane coating which exhibits unusual thermal stability and other outstanding chemical and physical properties.

It is a further object of the invention to provide a novel and improved polyurethane coating system which can be prepared in the form of a prepolymer solution which has an indefinite shelf life and which cures itself by mere evaporation of its solvent when it is applied to the surface that is to be protected.

Further objects and advantages of the invention will be apparent hereinafter.

In accordance with the invention, specified quantities of various aromatic polyisocyanates and combinations of the same, which are preliminarily dimerized and trimerized in a particular manner, are thoroughly mixed with ethylene glycol. In the mixing operation, the ethylene glycol is added into the polyisocyanate solution at a controlled rate so that the temperature of the intermixture does not exceed 140° F. The intermixture is then heated for 8–10 hours at 230° F. to form the desired prepolymer. The prepolymer is then dissolved in a suitable solvent or solvent mixture of acetone, cyclohexanone, tetrahydrofuran, butyl acetate and/or ethyl acetate. The solution can thereafter be applied to the surface to be protected by spraying, brushing or any other suitable conventional means of application. Curing or crosslinking occurs as the solvent evaporates without the application of heat or the use of a curing agent.

Specific and preferred embodiments of the improved process of the invention are illustrated by the following examples:

EXAMPLE I

.4 mole of 4,4′ diphenyl methane diisocyanate was heated as rapidly as possible to 400° F. to obtain a clear translucent amber liquid. The liquid 4,4′ diphenyl methane diisocyanate was then cooled to room temperature and solid impurities therein were centrifugally removed. The 4,4′ diphenyl methane diisocyanate was then thoroughly mixed with 1.4 moles of 2,4 toluene diisocyanate. A dropping funnel was then used to slowly add .6 mole of ethylene glycol to the diisocyanate intermixture such that the temperature of the reaction product did not exceed 140° F. The reaction product was then heated for 8 hours at 230° F. The resulting prepolymer was a clear yellow liquid which solidified at room temperature into a clear yellow brittle solid which had an indefinite shelf life.

EXAMPLE II

.6 mole of 4,4′ diphenyl methane diisocyanate was heated as rapidly as possible to 430° F. to obtain a clear translucent amber liquid. The liquid 4,4′ diphenyl diisocyanate was then cooled to room temperature and solid impurities therein were centrifugally removed. The 4,4′ diphenyl methane diisocyanate was then thoroughly mixed with 1.6 moles of 2,4 toluene diisocyanate. A dropping funnel was then used to slowly add 1.0 mole of ethylene glycol to the diisocyanate intermixture such that the temperature of the reaction product did not exceed 140° F. The reaction product was then heated for 10 hours at 230° F.

EXAMPLE III 10 grams of the prepolymer of Example I was dissolved in 5 grams of acetone.

EXAMPLE IV 10 grams of the prepolymer of Example I was dissolved in 20 grams of acetone.

EXAMPLE V 10 grams of the prepolymer of Example I was dissolved in 5 grams of cyclohexanone.

EXAMPLE VI 10 grams of the prepolymer of Example I was dissolved in 20 grams of cyclohexanone.

EXAMPLE VII 10 grams of the prepolymer of Example I was dissolved in 5 grams of tetrahydrofuran.

EXAMPLE VIII 10 grams of the prepolymer of Example I was dissolved in 20 grams of tetrahydrofuran.

EXAMPLE IX 10 grams of the prepolymer of Example I was dissolved in 5 grams of butyl acetate.

EXAMPLE X 10 grams of the prepolymer of Example I was dissolved in 20 grams of butyl acetate.

EXAMPLE XI 10 grams of the prepolymer of Example I was dissolved in 5 grams of ethyl acetate.

EXAMPLE XII 10 grams of the prepolymer of Example I was dissolved in 20 grams of ethyl acetate.

EXAMPLE XIII 10 grams of the prepolymer of Example I was dissolved in 10 grams of a one to one mixture by weight of cyclohexanone and butyl acetate.

EXAMPLE XIV 10 grams of the prepolymer of Example I was dissolved in 10 grams of a one to one mixture by weight of cyclohexanone and tetrahydrofuran.

EXAMPLE XV 10 grams of the prepolymer of Example I was dissolved in 10 grams of a one to one mixture by weight of cyclohexanone and ethyl acetate.

EXAMPLE XVI 10 grams of the prepolymer of Example I was dissolved in 10 grams of a one to one mixture by weight of cyclohexanone and acetone.

The above described prepolymers were applied to various types of surfaces, tested and found to have unusual hardness, outstanding mechanical and thermal properties and good chemical resistance. More specifically, the protective films or coatings on the surfaces were found to be unaffected by immersion for one week in 12 normal HCl. They were found to be unaffected by immersion for one week in 50% sodium hydroxide solutions. They exhibited excellent adhesion to etched aluminum panels. They withstood 180° bends on a ⅛ inch mandrel without deleterious effect. Bare films were folded without deleterious effect. They exhibited thermal stability for prolonged periods up to temperatures of 375°–400° F. They exhibited excellent hydrolytic stability at 200° F. and 90% humidity. They exhibited unusual solvent resistance and they had average tensile strengths of 10,000 p.s.i.

Obviously, many modifications and variatious of the present invention are possible in the light of the above teachings. It is therefore to be understood that within the scope of the appended claims, the invention may be practiced otherwise than as specifically described.

What is claimed is:

1. A method of protecting a surface with a polyurethane coating, said method comprising:
   (a) heating .4 to .6 moles of 4,4′ diphenyl methane diisocyanate to a temperature of 400°–430° F.;
   (b) cooling the 4,4′ diphenyl methane diisocyanate to room temperature and centrifuging out solid impurities;
   (c) thoroughly mixing 1.4–1.6 moles of another diisocyanate with the 4,4′ diphenyl methane diisocyanate;
   (d) adding .6–1.0 mole of ethylene glycol to the diisocyanate intermixture at a controlled rate so as to prevent the temperature of the resulting reaction product from exceeding 140° F.;
   (e) heating the reaction product for 8–10 hours at 230° F.;
   (f) dissolving the reaction product in one or more solvents selected from the group consisting of acetone, cyclohexanone, tetrahydrofuran, butyl acetate and ethyl acetate;
   (g) and applying the reaction product solution to the surface to be protected.

2. The method substantially as described in claim 1 wherein the solvent is acetone.

3. The method substantially as described in claim 2 wherein the solvent is cyclohexanone.

4. The method substantially as described in claim 2 wherein the solvent is tetrahydrofuran.

5. The method substantially as described in claim 2 wherein the solvent is butyl acetate.

6. The method substantially as described in claim 2 wherein the solvent is ethyl acetate.

7. The method substantially as described in claim 1 wherein the solvents are cyclohexanone and butyl acetate.

8. The method substantially as described in claim 7 wherein the solvents are cyclohexanone and tetrahydrofuran.

9. The method substantially as described in claim 7 wherein the solvents are cyclohexanone and ethyl acetate.

10. The method substantially as described in claim 7 wherein the solvents are cyclohexanone and acetone.

References Cited
UNITED STATES PATENTS

| | | | |
|---|---|---|---|
| 2,978,449 | 4/1961 | France | 260—77.5 |
| 3,205,200 | 9/1965 | Bunge | 260—77.5 |
| 3,218,348 | 11/1965 | McElroy | 260—31.2N |
| 3,380,950 | 4/1968 | Blomeyer | 260—32.8N |
| 3,454,533 | 7/1969 | Kerrigan | 260—77.5 |

MORRIS LIEBMAN, Primary Examiner

P. R. MICHL, Assistant Examiner

U.S. Cl. X.R.

260—31.2, 32.8, 77.5